May 18, 1965  R. W. JAY  3,183,600
CALIPER SURVEYING INSTRUMENT
Filed June 20, 1960  2 Sheets-Sheet 1

INVENTOR.
ROBERT W. JAY
BY
ATTORNEY

May 18, 1965 R. W. JAY 3,183,600
CALIPER SURVEYING INSTRUMENT
Filed June 20, 1960 2 Sheets-Sheet 2

INVENTOR.
ROBERT W. JAY
BY
ATTORNEY

United States Patent Office 3,183,600
Patented May 18, 1965

3,183,600
CALIPER SURVEYING INSTRUMENT
Robert W. Jay, Linch, Wyo., assignor to Continental Oil Company, Ponca City, Okla., a corporation of Delaware
Filed June 20, 1960, Ser. No. 37,187
10 Claims. (Cl. 33—178)

This invention relates to a well bore caliper surveying instrument of the type which is used to measure the variation in diameter either in uncompleted or cased well bores.

The present method for measuring the variation in the diameter of a well bore throughout its length is performed by lowering into a well bore a caliper having downwardly extending and outwardly spring biased caliper arms. The caliper arms are generally releasably secured against the side of the caliper body. When the caliper reaches a predetermined depth, the caliper arms are released by a triggering mechanism which will permit the arms to spring outward and engage the side of the well bore. The triggering mechanism is generally controlled from the surface through an electrical conductor in the log hoisting cable. The caliper log is then slowly brought to the well surface. Since the caliper arm extensions are spring biased in an outward direction, variations in the well bore diameter will cause a corresponding variation in the extension diameter of the caliper arms. The variation in the extension diameter of the caliper arms is either recorded in the instrument or transmitted to the surface through a conductor in the caliper hoisting cable. The logging caliper described requires a complicated mechanism to release the caliper arm extensions when the caliper reaches the desired depth. Some embodiments further require a conductor cable in order to release the mechanism. Further, the releasing mechanism usually exposes the internal portion of the log to mud pollution and contamination.

Therefore, it is an object of this invention to provide a well bore caliper that does not require the complex mechanism for extending the caliper arms.

It is a further object of this invention to eliminate the necessity for a conductor within the hoisting cable.

It is a still further object of this invention to provide a caliper log which will give an accurate indication of well bore diameter variations as the log is being lowered rather than being raised in the well bore.

This invention features a caliper log having a plurality of caliper arms rotatably mounted thereon. The arms are mounted so that they are upwardly extending as the caliper log is lowered into a bore hole. Gearing means are provided to interconnect the plurality of caliper arms, thereby confining all the caliper arms to the same angular rotation or radius of extension. Recording means is connected to the caliper arms so that the slighest variation in bore hole depth may be detected. With the arms upwardly extending, the logging is performed as the log is lowered downhole, thereby eliminating the necessity for caliper arm extending means when the caliper arrives at the bottom.

Further objects, features, and advantages of the invention will become apparent from the following description and claims when read in view of the accompanying drawings, in which:

FIG. 1 discloses a cross-sectional view of the caliper taken through section lines 1—1 indicated in FIG. 2.

Figure 1:
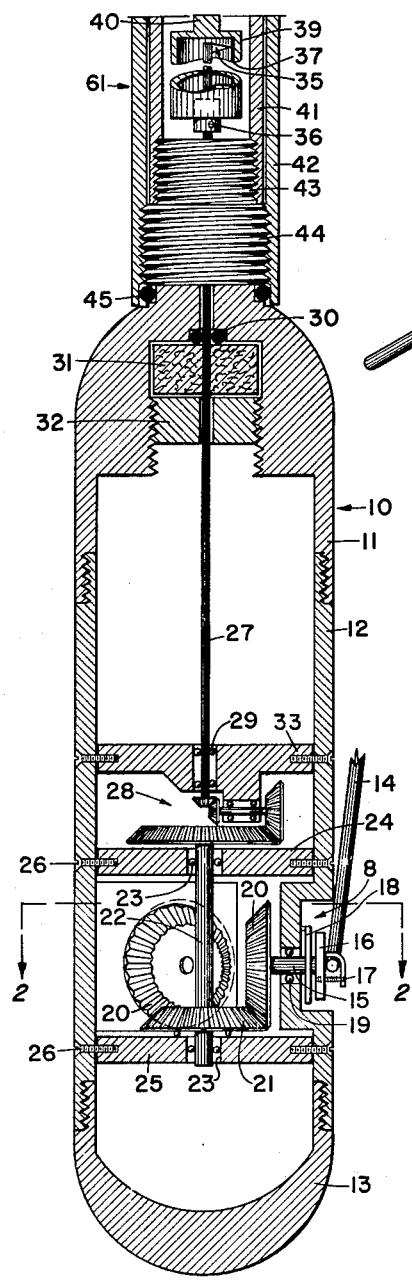
Figure 2:
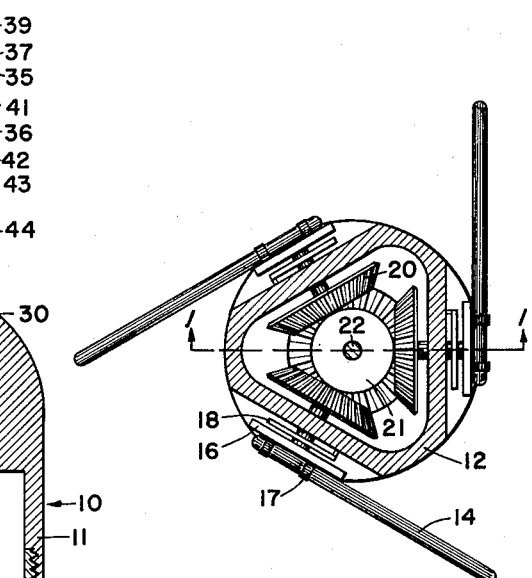
FIG. 2 shows a cross-sectional view of the caliper log through section line 2—2 indicated in FIG. 1.
Figure 3:
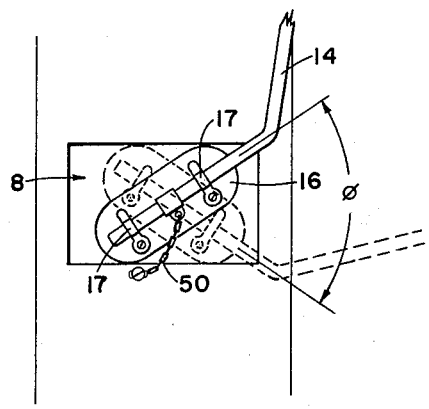
FIG. 3 shows a detailed drawing of a preferred method of connecting the caliper arms to the caliper arm shaft.
Figure 4:
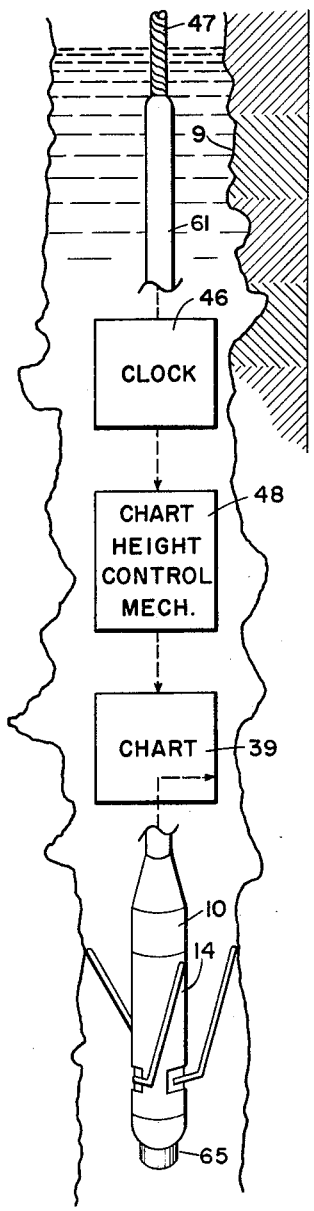
FIG. 4 shows a downhole view of the entire caliper in combination with the recording device.

Referring to the figures in general and in particular to FIGS. 1, 2, and 3, numeral 10 refers generally to a caliper log where portions 11, 12, and 13 form the body shell enclosing the internal mechanism of the log. A plurality of upwardly extending caliper arms 14 are pivotally connected to caliper log 10 by a shaft 15. A plate 16 and clamps 17 are used to secure caliper arm 14 to shaft 15. A spiral spring 18 is used to maintain the caliper arm 14 in a maximum radially extended position. A means such as ball bearings 19 are used to journal shaft 15 in body portion 12. The bearings may be other well known types such as sleeve bearings and preferably water tight, thus preventing the mud or other fluid in the well bore from entering the internal portion of the log. Each caliper arm 14 has a bevel gear 20 rigidly mounted on the other end of shaft 15. Each of the bevel gears 20 is in engagement with a bevel gear 21. Bevel gear 21 is rigidly attached to a shaft 22 which is rotatably mounted to body portion 12 by means of a pair of ball bearings 23. Supports 24 and 25 are rigidly attached to the body portion 12 of caliper log 10 by any well known means such as screws 26. The movement of shaft 22 is then coupled to another shaft 27 through a plurality of gears 28. Bearings 29 and 30 which are rotatably mounted in support 33 and body portion 11, respectively, and support shaft 27. Packing 31 and packing retaining means 32 provide a tight seal between the inside and outside of caliper log 10. The caliper log may be filled with a heavy oil to aid in lubrication of the gears and to assist in preventing external fluid matter such as mud or water from entering openings such as bearings 19. The log 10 is designed to attach to an indicating device which may be, for example, an Amerada RPG-3 gauge (Patent No. 2,144,762) which is manufactured by Geophysical Research Corporation, Tulsa, Oklahoma. However, any suitable recording gauge may be used which can record a rotation from shaft 27 and interpret it as variations in bore diameter, for example, an electric potentiometer could be connected to shaft 27 and the variation in output electrically transmitted to the surface by means of a conductor cable. However, the preferred embodiment attaches to a charting mechanism 61 which will record variations in the rotational position of shaft 27. In the preferred embodiment, a scribe 35 is connected to the end of shaft 27 by a coupling means such as 36. A chart 37 is placed about the internal portion of cylindrical chart holder 39 and has its inner surface in engagement with the point of scribe 35. A clock controlled chart raising mechanism 48 (see FIG. 4) is connected to shaft 40. The chart is protected from the mud and other well fluids by sleeves 41 and 42 which are attached to caliper log 10 by thread portions 43 and 44, respectively. An O ring 45 provides a tight seal thereby excluding the well bore fluids from the internal portion of the chart mechanism.

In operation (see FIG. 4), caliper log 10 in combination with chart mechanism 61 is lowered into a bore hole such as by a cable 47. Spiral springs 18 cause caliper arms 14 to be in contactual engagement with the inner surface of the well bore 9 at all times. Since all of the caliper arms 14 are interconnected through bevel gears 20 to a single bevel gear 31, any nonuniformity between the extensions of the caliper arms 14 will be compensated for by a slight shift in the location of the caliper log 10.

In order to restrain the maximum movement of the caliper arms 14, mounting plates 16 are designed to strike the upper and lower edges of slot 8 (see FIG. 3), thereby limiting the total movement of the shaft 15 to a maximum angle $\phi$. Thus, only a single chart is needed to measure the bore diameter. As the combination log and recording instrument is lowered into the bore hole a clock or timer 46 is operated. The output shaft 40 of the clock is mechanically coupled to the chart height control mechanism 48 such that a lapse of time will cause the chart holder 39 to gradually rise. Thus, as the caliper arms 14 detect variations in the well bore diameter, the stylus or scribe 35 will move or rotate about the circumference of the chart 37, inscribing the movement in the surface of the chart. Coupled with the rotation movement of the scribe is the upward movement of the chart controlled by clock timer 46 and height control mechanism 48. A record will then be formed which will correspond to the depth versus well bore diameter if the caliper log 10 is lowered at a uniform rate. For maximum sensitivity, the gear ratio of the bevel gears 20, 21, and gears 28 is selected such that movement of the caliper arms through their maximum angle $\phi$ (see FIG. 3) will cause the scribe to move the entire height of the chart.

Figure 5:
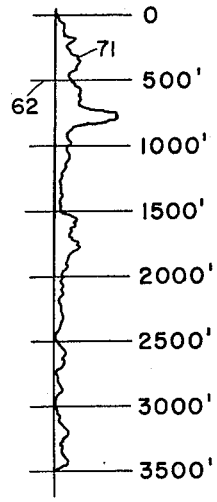
FIG. 5 is a chart formed by lowering the caliper into a bore hole at a continuous rate of speed.
Figure 6:
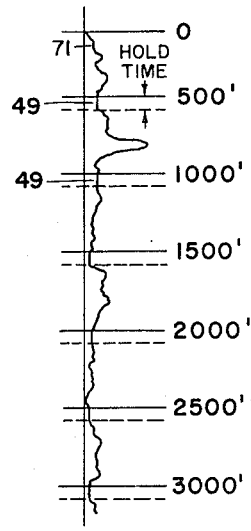
FIG. 6 is a chart illustrating a method of accurately recording depth on the chart record by holding the caliper at a predetermined depth for a fixed period of time.

FIG. 5 illustrates a chart formed when the caliper 10 is lowered at a uniform rate in the bore hole. Inscribed line 71 is characteristic of the mark formed on chart 37 by scribe 35. The distance from the surface to the 500 foot mark 62 is determined by noting the elapsed time required to lower the log 500 feet. The distance that the scribe moves down the chart during that period of time is also known. Therefore, all the factors required for placing the 500 foot mark 62 on the chart are available. The remaining depth lines are similarly calculated and inserted on the chart. It is realized that this method of determining depth is only approximate since variations in lowering time or chart movement time could result in depth errors. However, chart depth errors can be corrected by holding the caliper at any desired depth for a discrete period of time, thereby causing the scribe to form a straight line portion 49 (see FIG. 6) on the inscribed line 72. Using this method, the depth of the caliper log 72 is determined by the length of the cable 47 which has been unreeled into the bore hole. Other means could be used to mark the scale such as a surface controlled electric signal which would mechanically actuate the scribe, thereby forming a pulse at each discrete depth desired. More accurate methods as described above are particularly advantageous where the diameter of the bore hole at a particular depth must be known, as for example, during a cementing operation wherein the volume of cement at that particular depth must be known with a degree of accuracy.

When the caliper log reaches the lowest depth that is desired to be measured, it is forcibly pulled in an upwardly direction. This will cause caliper arms 14 to snap out of clamps 17. Chain 50 may then be used to catch and restrain caliper arms 14, thereby preventing them from falling to the bottom of the hole. In lieu of chain 50 other means such as a magnet 65 mounted on body portion 13 may be used to retrieve the arms (see FIG. 4). Arms 14 further may be made of a relatively soft metal such that they will bend rather than break. For this function, clamps 17 should be secure enough to rigidly hold the caliper arms. Since caliper arms 14 may be cheaply and easily manufactured, they may be readily replaceable if they are damaged either because of wear or because of the destructive usage when the caliper log is pulled up the bore hole. The arms could also be formed of a drillable metal so that if they should fall to the bottom of the hole the drill bit could later pulverize them, thereby eliminating the requirement of a fishing operation.

Although this invention has been described with respect to particular embodiments thereof, it is not to be so limited, as changes and modifications may be made therein which are within the spirit and scope of the invention as defined by the appended claims.

I claim:

1. An apparatus for logging the diameter of a bore hole comprising: a housing having an upper and lower end adapted to be lowered into a well bore; a central shaft rotatably mounted therein; a plurality of caliper arms; shaft means pivotally mounting each of said caliper arms to said housing at its lower end, said caliper arms extending toward the upper end of said housing when in normal use; means coupling each shaft means to said central shaft; and recording means connected to said central shaft and responsive to movement of said central shaft, whereby a variation in the well bore diameter is communicated by said caliper arms to said recording means through said central shaft.

2. An apparatus for logging the diameter of a bore hole comprising: a housing adapted to be lowered into a well bore; a central shaft rotatably mounted therein; a recording means attached to the upper end of said central shaft; and a bevel gear attached to the lower end of said central shaft; a plurality of caliper arms extending from said housing, said caliper arms having an upper and lower end when said apparatus is in normal use, said lower end pivotally attached to said housing; means connecting each of said pivotally attached caliper arms to said bevel gear.

3. A device as described in claim 2 and further characterized in that said plurality of caliper arms are spring biased away from said housing.

4. An apparatus for logging the diameter of a bore hole comprising: a housing adapted to be lowered into a borehole; a first central shaft rotatably mounted therein; a recording means connected to one end of said first central shaft; a second central shaft; coupling means connecting one end of said second central shaft to the remaining end of said first central shaft; a plurality of caliper arms; a plurality of corresponding caliper arm mounting shafts mounted transversely through said housing; means for attaching said caliper arms to one end of said caliper shafts; means for communicating the movement of each of said caliper shafts attached between the remaining end of said caliper arm shafts and the remaining end of said second central shaft whereby a variation in said borehole diameter is communicated by said caliper arms through said first and second central shafts to said recording means.

5. A device as described in claim 4 and further characterized in that said means for attaching said caliper arms to one end of said caliper shaft comprises: an elongated plate, said plate containing clip means adapted to rigidly clip said caliper arms to said plate, the dimension of said plate being selected to limit the movement of said caliper arm through a maximum predetermined angle.

6. A device as described in claim 5 and additionally including means for retrieving said caliper arms when said housing is pulled up hole.

7. A device as described in claim 6 wherein said retrieving means comprises: a magnet mounted on the lower portion of said housing.

8. A device as described in claim 5 wherein said clip means are adapted to release said caliper arms when said housing is pulled up hole.

9. In a logging device of the type which is adapted to be lowered into a bore hole for the purpose of measuring the diameter of a bore hole, having a housing adapted to be lowered into said borehole; a central shaft rigidly mounted within said housing; a plurality of caliper arms; rotatable means rigidly secured to said caliper arms and in communication with said central shaft; and a recording means in communication with said central shaft; an improvement comprising means for: securing said caliper arms on their lower portion thereof, the upper portion of said caliper arms extending toward the upper portion of said housing, said caliper arms spring biased away from said housing and in communication with the wall of said borehole, whereby a bore hole may be calipered, by movement of said caliper arms which are responsive to variation in said borehole diameter as said logging device is lowered into said borehole is communicated through said rotatable means and said central shaft means to said recording means.

10. An apparatus for logging the diameter of a bore hole comprising: a housing having an upper and lower end; a first central shaft rotatably mounted in said housing; a recording shaft having a scribe axially connected to the end of said first central shaft and responsive to movements therefrom; a drum containing a recording medium on its inner surface axially surrounding said scribe, said recording shaft in communication with said recording medium; timing means attached to said drum, said timing means adapted to raise said drum a predetermined amount for each increment of elapsed time; a second central shaft; means coupling one end of said second central shaft to the remaining end of said first central shaft; a bevel gear axially mounted on the remaining end of said second central shaft; a plurality of caliper arms; a plurality of corresponding caliper arm shafts extending transversely through the lower portion of said housing; means for attaching one end of said caliper arms to the outer end of said transverse caliper arm shafts; a bevel gear mounted on the other end of each of said transverse caliper arm shafts and in communication with the bevel gear mounted to said second central shaft, the remaining end of said caliper arms extending toward the upper end of said housing and adapted to engage the wall of said borehole, whereby a variation in said borehole diameter is communicated by said caliper arms through said first and second central shafts to the scribe of said recording medium, said scribe marking said recording medium in time correspondence with the movement of said caliper arms.

References Cited by the Examiner
UNITED STATES PATENTS

| | | |
|---|---|---|
| 1,890,607 | 12/32 | Hite. |
| 1,951,629 | 3/34 | Ross. |
| 2,427,950 | 9/47 | Doll. |
| 2,622,334 | 12/52 | Wiley _____ 33—178 |
| 2,899,633 | 8/59 | Smith et al. _____ 33—178 X |

ISAAC LISANN, *Primary Examiner.*